Figure 2:
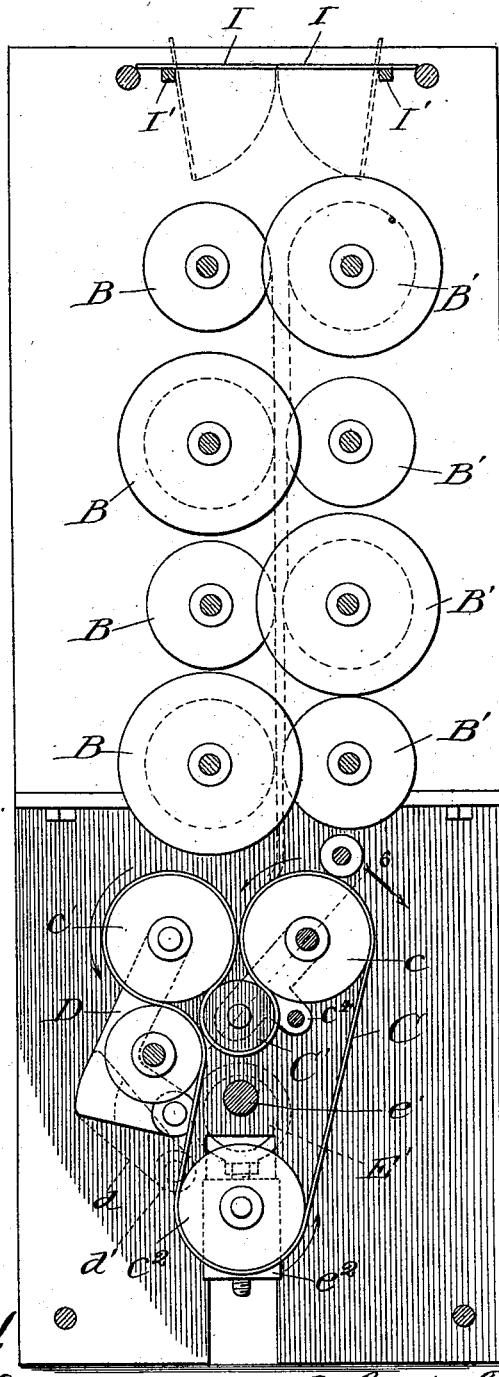

(No Model.)  4 Sheets—Sheet 1.
P. F. & A. F. BRYCE.
BREAD MAKING MACHINE.
No. 601,221. Patented Mar. 22, 1898.
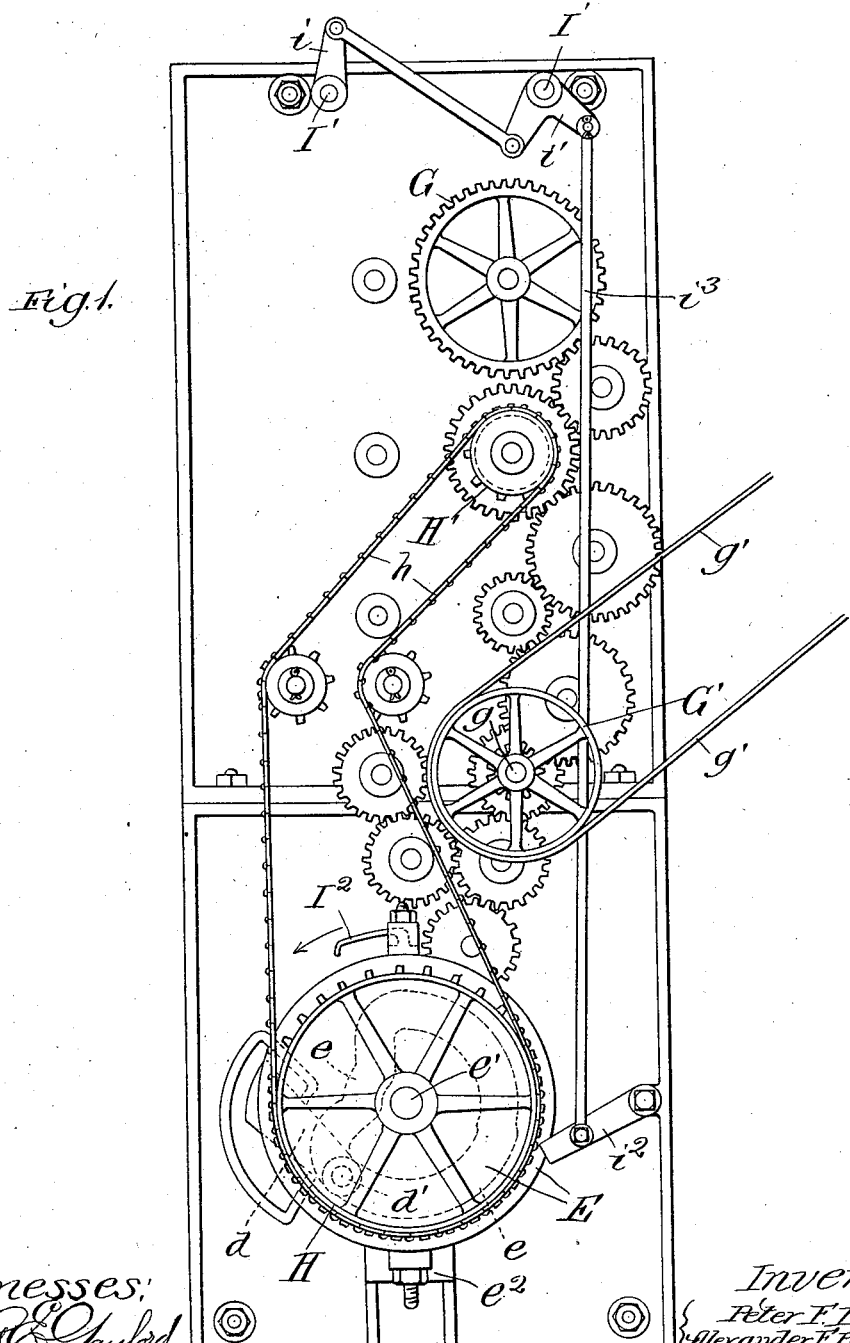
Fig.1.
Witnesses:
Inventors:
Peter F. Bryce,
Alexander F. Bryce,

(No Model.) 4 Sheets—Sheet 2.

P. F. & A. F. BRYCE.
BREAD MAKING MACHINE.

No. 601,221. Patented Mar. 22, 1898.

Witnesses:

Inventors:
Peter F. Bryce,
Alexander F. Bryce,
By Banning & Banning & Sheridan,
Attys.

(No Model.)  
4 Sheets—Sheet 3.
P. F. & A. F. BRYCE.
BREAD MAKING MACHINE.
No. 601,221.  
Patented Mar. 22, 1898.
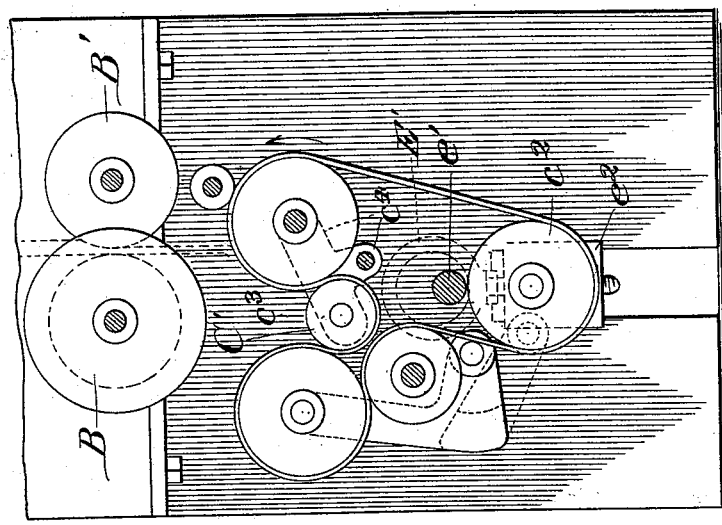
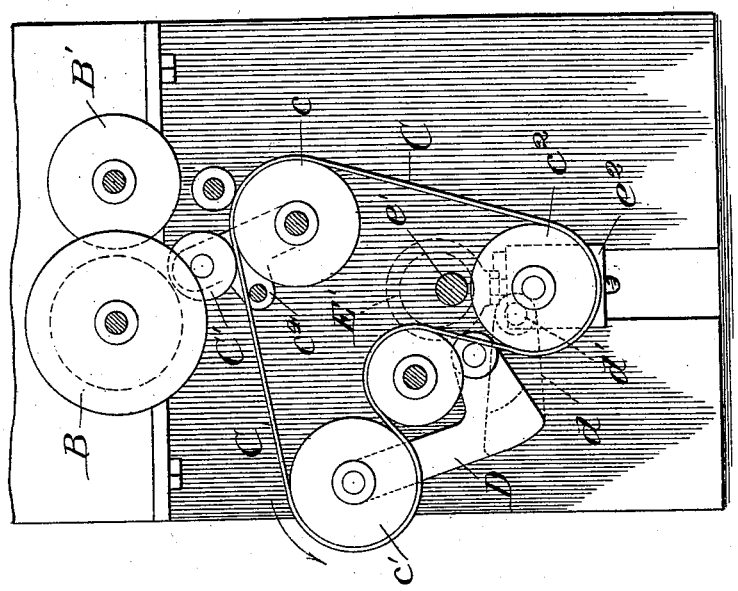
Witnesses:
Inventors  
Peter F. Bryce  
Alexander F. Bryce

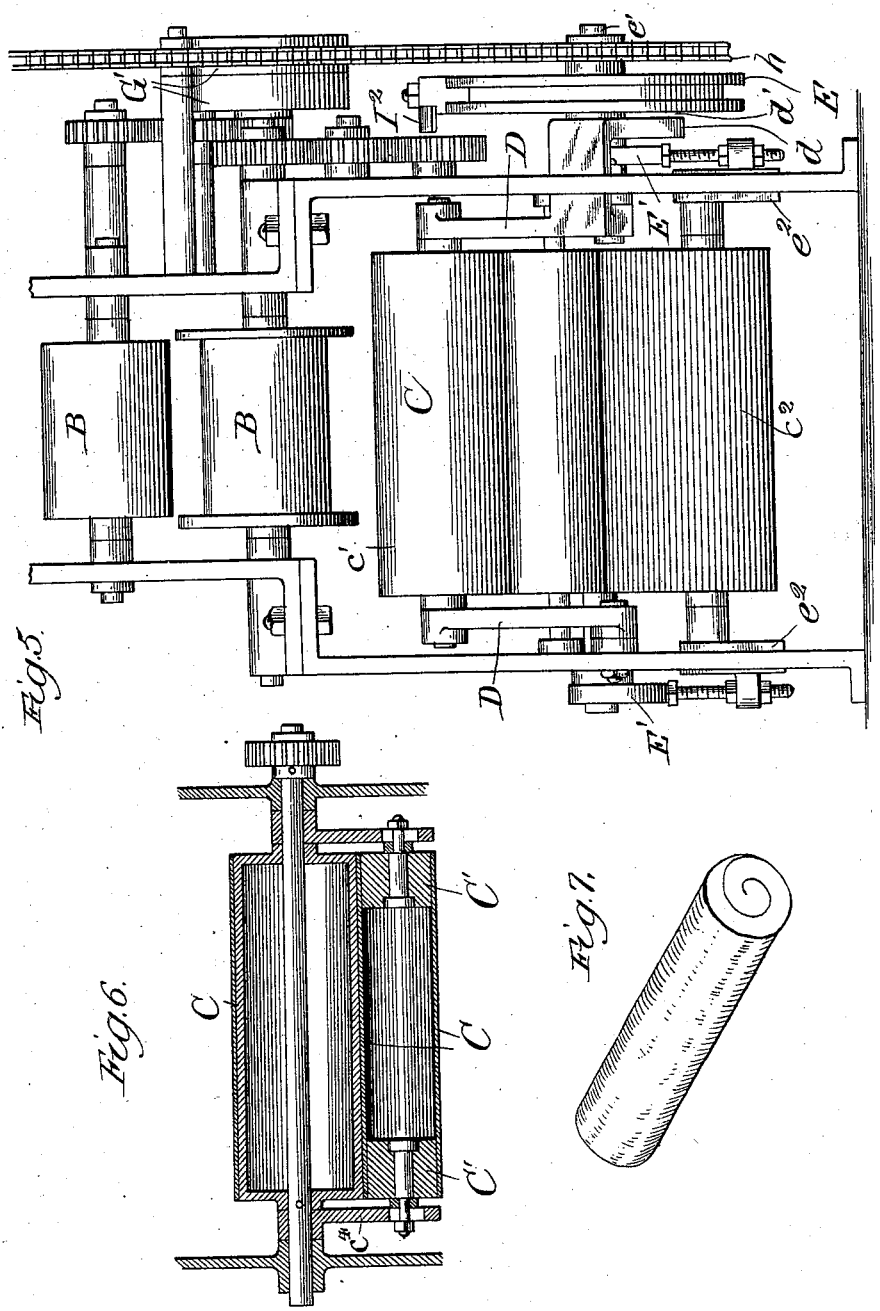

UNITED STATES PATENT OFFICE.

PETER F. BRYCE AND ALEXANDER F. BRYCE, OF CHICAGO, ILLINOIS, ASSIGNORS TO THE BRYCE BAKING COMPANY, OF SAME PLACE.

BREAD-MAKING MACHINE.

SPECIFICATION forming part of Letters Patent No. 601,221, dated March 22, 1898.

Application filed May 10, 1897. Serial No. 635,837. (No model.)

*To all whom it may concern:*

Be it known that we, PETER F. BRYCE and ALEXANDER F. BRYCE, citizens of the United States, residing at Chicago, in the county of Cook and State of Illinois, have invented certain new and useful Improvements in Bread-Making Machines, of which the following is a specification.

Our invention relates to a bread-making machine in which a piece of dough is first reduced to substantially the desired length, width, and thickness and afterward rolled, compressed, or formed by means of operating mechanisms into cylindrical shape.

The object of our invention is to provide a simple, economical, and efficient machine for forming a piece of dough into a substantially cylindrical shape; and the invention consists in the features, combinations, and details of construction hereinafter described and claimed.

In the accompanying drawings, Figure 1 is a side elevation of one form of machine in which our invention may be embodied; Fig. 2, a vertical sectional elevation showing the operating mechanisms taken just inside of the case. Figs. 3 and 4 are similar views of the lower portion of the machine, showing it in its different positions; Fig. 5, a front elevation of the lower portion of the machine; Fig. 6, a sectional elevation taken on line 6 of Fig. 2, and Fig. 7 a perspective view of one of the rolls of dough after it has been formed.

In the art to which this invention relates it is well known that the round or cylindrical-shaped rolls of bread have been formed altogether by hand, making it necessarily a laborious and expensive process. The principal object of our invention therefore is to provide means for first reducing the dough required for a single loaf of bread to the desired length, width, and thickness, and, next, to provide means, as hereinafter described, to form the web or reduced dough into a round roll or cylindrical-shaped loaf.

In constructing a machine in accordance with our improvements we make a frame portion A of the desired shape and size and adapted to support, contain, and incase the operative mechanisms. In order to reduce the dough to the desired length, width, and thickness, we prefer to provide a set of four pairs of reducing-rolls B and B', that reduce the roll in a step-by-step manner from the rough lump of dough to a web, substantially as shown in dotted outline in Fig. 2. These reducing-rolls are made of a desired diameter, arranged a desired distance apart, and given the correct speed in order to facilitate the passage and reducing of the dough between the same.

In order to form the web or sheet of dough into a roll of bread, as shown in Fig. 7, we provide a forming-belt C and mount it upon three pulleys $c$, $c'$, and $c^2$, the axis of the pulley $c$ being practically stationary. Fig. 3 shows the belt with its supporting guiding-pulleys in their first position—that is, in such position for the dough to contact the same. The dough contacts the belt, as shown in this figure, and passes into the space $c^3$, which space is made and formed by two idler-rolls C', arranged at each lateral edge of the belt, as shown particularly in Fig. 6, and which are arranged such a distance apart as to provide the desired length for a loaf of bread and of such diameter as to provide the correct diameter of the roll of bread. These idler-rolls are mounted upon pivotal arms $c^4$, so that they may easily move into or out of position by their own weight. As the web or sheet of dough is fed into this space $c^3$ it is desirable that such space be closed, so as to compress the dough after it enters such recess and form it by means of such belt into the desired cylindrical shape. In order to accomplish this result, the roll $c'$ is mounted upon a vibrating or pivoted lever-arm D, which lever-arm has an arm $d$, extending therefrom, carrying a roll $d'$, which enters a recess $e$ of a cam E, the recess of the rotating cam being so shaped as to vibrate the lever D, with its movable roll, into the positions shown in Figs. 2, 3, and 4. After the required amount of dough has been fed into the space $c^3$ the cam E rotates and moves the vibrating lever D, with its roll or pulley, into the position shown in Fig. 2. At the same time the shaft $e'$, upon which the cam is mounted, rotates and operates an eccentric E', so as to push down the sliding journal $e^2$ of the roll $c^2$ and stretch the compressing-belt in such manner as to take up all the slack and furnish sufficient pressure to finish the compressing and forming of the roll of dough.

In order to drive the reducing-rolls and operate the same, the rolls are provided with a train of intermeshing gears G, which train is driven from a common shaft $g$, operated by means of the driving-pulley G', the belt $g'$ of which is led to any desired source of motive power. The cam-shaft is provided with a sprocket H and one of the roll-shafts provided with a sprocket H', around both of which is passed a sprocket-chain $h$ for the purpose of furnishing desired power, speed, and motion to the cam-shaft.

In order to feed lumps of dough to make a roll of bread into the reducing-rolls at the desired times, we prefer to provide the upper part of the machine with trap-doors I, which are mounted upon rock-shafts I', the doors being arranged above and in line with the first pair of reducing-rolls. The rock-shafts are provided with bell-cranks $i\ i'$, the bell-cranks $i'$ being connected with a vibrating trip-lever arm $i^2$ by means of a link $i^3$. The cam E is provided with a projection $I^2$, arranged so as to contact the trip-lever once in its rotation, lift the same, vibrate the bell-crank levers, and open the trap-doors, so as to allow the lump of dough to drop in and be contacted by the first set of reducing-rolls.

In operation the machine is started and a lump of dough placed on the trap-doors. During the course of operation the trap-doors are automatically opened, permitting the dough to drop in and engage with the first set of reducing-rolls, which reduce it partially and feed it onto the second set of rolls, where it is further reduced and passed to the third set of rolls, where it is further reduced, then passed to the last set of rolls, where it is reduced to the desired length, width, and thickness. The dough next contacts the forming-belt when it is in the position shown in Fig. 3 and passes into the space $c^3$, forming first a hollow cylinder, being compelled to be further rolled in such space, so as to form a spiral shape, as shown in Fig. 7. When all of the dough has been fed into such space, the cam heretofore described operates the parts and moves them to the position shown in Fig. 2, so that the continued movement of the forming-belt forces the roll of dough into a still smaller space. The movement of the belt-roll $c^2$ downwardly stretches the belt and acts to still further compress the roll of dough into a diameter equal to the idler-rolls C'. As the rotation of the operating-cam continues the vibrating roll $c'$, with the forming-belt, is moved into the position shown in Fig. 4 and the roll of dough delivered from such belt at the point indicated by the arrow in such figure. The parts are then returned to the position shown in Fig. 3 to receive the next sheet or web of dough and the operations continued over and over as long as dough is fed into the machine and the parts kept in motion.

We claim—

1. In a bread-making machine, the combination of a set of rolls for receiving and reducing a piece of dough to a sheet and web of a desired width and thickness required for a single loaf of bread, and roll-and-belt mechanism to receive the sheet of dough and roll it up into a substantially cylindrical loaf, substantially as described.

2. In a bread-making machine, the combination of a movable belt, a set of rolls or pulleys upon which such belt is mounted and moved, and means for operating one or more of the pulleys and moving them in connection with the belt so as to form a substantially cylindrical space in which a piece of dough may be received and formed or rolled into a cylindrical loaf, substantially as described.

3. In a bread-making machine, the combination of a movable belt, a pulley the axis of which is relatively fixed for supporting and holding one portion of the belt, a second pulley arranged to be vibrated to and from the relatively-fixed pulley and adapted to control another portion of the belt, a third pulley arranged to be given a substantially rectilinear motion for the purpose of stretching or compressing the dough, and an idler pulley or pulleys contacting the upper surface of the belt adjacent to and between the fixed and vibrating pulleys so as to compel such belt to form a space in which it may receive a piece of dough and form it into a substantially cylindrical shape, substantially as described.

4. In a bread-making machine, the combination of a movable forming-belt, a pulley having its axis relatively fixed for guiding and supporting such belt in a portion of its path of motion, a second roll or pulley vibratingly mounted for supporting and operating another portion of such belt, a cam and shaft for vibrating the last-named pulley, a third pulley or roll having a reciprocating motion to take up the slack and act as a compresser on such belt, eccentric mechanism upon the cam-shaft adapted to rotate in common with such cam and impart a reciprocating motion to the third-named pulley, and a pair of idler-rolls vibratingly mounted adjacent to and between the fixed and vibrating pulleys so as to contact the forming-belt at each of its lateral edges to compel such belt to form a space in which a piece of dough may be received and formed into a substantially cylindrical shape, substantially as described.

5. In a bread-making machine, the combination of a forming-belt, roll mechanism for guiding such belt and in connection therewith forming a space in which a piece of dough is rolled into a cylindrical shape and mechanism for alternately operating such belt to discharge the formed loaf of dough, substantially as described.

6. In a bread-making machine, the combination of a set of reducing-rolls arranged in a substantially vertical plane one above the other, rolls and forming-belt mechanism arranged underneath such set of rolls and adapted to receive the sheet of dough required for a single loaf of bread and roll it up into a substantially cylindrical loaf, a trap door or doors arranged above the rolls adapted to receive and hold a piece of dough required for a single loaf of bread, and means connected with a movable part of the machine for automatically opening such doors to allow the piece of dough to drop into the reducing-rolls at certain predetermined times, substantially as described.

7. In a bread-making machine, the combination of a set of reducing-rolls for reducing a piece of dough into a sheet of the desired length, width and thickness, a movable forming-belt, rolls or pulleys upon which such forming-belt is moved and mounted to compel it to assume the desired shapes to receive the sheet of dough, form it into a cylindrical shape and discharge it therefrom, cam mechanism for operating the rolls or pulleys upon which the belt is moved and mounted to operate and move such rolls and compel the belt to assume its desired shapes, a trap door or doors arranged adjacent to the first pair of rolls and adapted to hold a piece of dough and drop it into such rolls at predetermined times, rock-shafts upon which such doors are mounted, and mechanism interposed between such rock-shafts and the cam mechanism and arranged to be contacted by a projection or tappet on the cam and operate such doors to open them at the desired times, substantially as described.

PETER F. BRYCE.
ALEXANDER F. BRYCE.

Witnesses:
  THOMAS F. SHERIDAN,
  THOMAS B. McGREGOR.